(12) United States Patent
Torok et al.

(10) Patent No.: US 9,240,187 B2
(45) Date of Patent: *Jan. 19, 2016

(54) IDENTIFICATION OF UTTERANCE SUBJECTS

(71) Applicant: Amazon Technologies, Inc., Seattle, WA (US)

(72) Inventors: Fred Torok, Seattle, WA (US); Frédéric Johan Georges Deramat, Bellevue, WA (US); Vikram Kumar Gundeti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,365

(22) Filed: Mar. 9, 2015

(65) Prior Publication Data

US 2015/0179175 A1 Jun. 25, 2015

Related U.S. Application Data

(63) Continuation of application No. 13/723,026, filed on Dec. 20, 2012, now Pat. No. 8,977,555.

(51) Int. Cl.
*G10L 21/00* (2013.01)
*G10L 25/00* (2013.01)
(Continued)

(52) U.S. Cl.
CPC .............. *G10L 15/26* (2013.01); *G06F 17/3074* (2013.01); *G06F 17/30684* (2013.01); *G06F 17/30746* (2013.01); *G06F 17/30778* (2013.01); *G10L 15/08* (2013.01)

(58) Field of Classification Search
CPC ......... G10L 15/26; G10L 15/22; G10L 17/22; G10L 21/06; G10L 13/02; G10L 15/02; G10L 15/30; G10L 13/027; G10L 13/033; G10L 2015/223; G10L 13/00; G06F 2203/0381
USPC ......... 704/233, 235, 246, 255, 257, 260, 261, 704/270, 270.1, 275
See application file for complete search history.

(56) References Cited

U.S. PATENT DOCUMENTS 4,777,600 A 10/1988 Saito et al.
5,752,230 A 5/1998 Alonso-Cedo
(Continued)

FOREIGN PATENT DOCUMENTS

WO     WO 99/16051     4/1999

*Primary Examiner* — Edgar Guerra-Erazo
(74) *Attorney, Agent, or Firm* — Knobbe, Martens, Olson & Bear, LLP

(57) ABSTRACT

Features are disclosed for generating markers for elements or other portions of an audio presentation so that a speech processing system may determine which portion of the audio presentation a user utterance refers to. For example, an utterance may include a pronoun with no explicit antecedent. The marker may be used to associate the utterance with the corresponding content portion for processing. The markers can be provided to a client device with a text-to-speech ("TTS") presentation. The markers may then be provided to a speech processing system along with a user utterance captured by the client device. The speech processing system, which may include automatic speech recognition ("ASR") modules and/or natural language understanding ("NLU") modules, can generate hints based on the marker. The hints can be provided to the ASR and/or NLU modules in order to aid in processing the meaning or intent of a user utterance.

20 Claims, 6 Drawing Sheets

(51) Int. Cl.
*G10L 13/00* (2006.01)
*G10L 15/00* (2013.01)
*G10L 15/26* (2006.01)
*G06F 17/30* (2006.01)
*G10L 15/08* (2006.01)

(56) References Cited

U.S. PATENT DOCUMENTS

| | | | |
|---|---|---|---|
| 6,021,306 | A | 2/2000 | McTaggart |
| 6,023,675 | A * | 2/2000 | Bennett et al. ................ 704/235 |
| 6,163,767 | A | 12/2000 | Tang et al. |
| 6,192,337 | B1 | 2/2001 | Ittycheriah et al. |
| 6,269,335 | B1 | 7/2001 | Ittycheriah et al. |
| 6,282,510 | B1 * | 8/2001 | Bennett et al. ................ 704/235 |
| 6,418,328 | B1 | 7/2002 | Shon |
| 6,421,672 | B1 | 7/2002 | McAllister et al. |
| 6,791,529 | B2 | 9/2004 | Shteyn |
| 6,925,154 | B2 | 8/2005 | Gao et al. |
| 6,933,928 | B1 | 8/2005 | Lilienthal |
| 6,937,977 | B2 | 8/2005 | Gerson |
| 6,947,539 | B2 | 9/2005 | Graham et al. |
| 6,961,695 | B2 | 11/2005 | Lawrence |
| 7,013,280 | B2 | 3/2006 | Davis et al. |
| 7,050,560 | B2 | 5/2006 | Martin et al. |
| 7,069,221 | B2 | 6/2006 | Crane et al. |
| 7,085,716 | B1 | 8/2006 | Even et al. |
| 7,096,232 | B2 | 8/2006 | Doss et al. |
| 7,181,387 | B2 | 2/2007 | Ju et al. |
| 7,200,555 | B1 | 4/2007 | Ballard et al. |
| 7,299,181 | B2 | 11/2007 | Ju et al. |
| 7,630,893 | B2 * | 12/2009 | Lauvergne et al. ............ 704/235 |
| 7,769,592 | B2 | 8/2010 | Kemble et al. |
| 7,991,608 | B2 | 8/2011 | Johnson et al. |
| 8,352,876 | B2 | 1/2013 | Batarseh et al. |
| 8,756,057 | B2 | 6/2014 | Miller et al. |
| 2002/0128831 | A1 | 9/2002 | Ju et al. |
| 2005/0246173 | A1 | 11/2005 | Creamer et al. |
| 2006/0004572 | A1 | 1/2006 | Ju et al. |
| 2006/0116877 | A1 | 6/2006 | Pickering et al. |
| 2006/0136195 | A1 | 6/2006 | Agapi et al. |
| 2006/0212292 | A1 * | 9/2006 | Lauvergne et al. ............ 704/235 |
| 2006/0247913 | A1 | 11/2006 | Huerta et al. |
| 2006/0247915 | A1 | 11/2006 | Bradford et al. |
| 2006/0247931 | A1 | 11/2006 | Caskey et al. |
| 2007/0100626 | A1 | 5/2007 | Miller et al. |
| 2007/0143100 | A1 | 6/2007 | Agapi et al. |
| 2008/0120312 | A1 | 5/2008 | Reed et al. |
| 2009/0024411 | A1 * | 1/2009 | Albro et al. ...................... 705/2 |
| 2009/0132234 | A1 | 5/2009 | Weikel |
| 2009/0202226 | A1 | 8/2009 | McKay |
| 2009/0326948 | A1 | 12/2009 | Agarwal et al. |
| 2010/0023320 | A1 | 1/2010 | Di Cristo et al. |
| 2010/0050064 | A1 | 2/2010 | Liu et al. |
| 2011/0106283 | A1 | 5/2011 | Robinson |
| 2011/0124264 | A1 | 5/2011 | Garbos |
| 2011/0131036 | A1 | 6/2011 | DiCristo et al. |
| 2011/0153331 | A1 | 6/2011 | Dong et al. |
| 2011/0231182 | A1 | 9/2011 | Weider et al. |
| 2011/0246175 | A1 | 10/2011 | Yi et al. |
| 2011/0313757 | A1 | 12/2011 | Hoover et al. |
| 2013/0124202 | A1 | 5/2013 | Chang |
| 2014/0297279 | A1 | 10/2014 | Miller et al. |
| 2014/0372115 | A1 * | 12/2014 | LeBeau et al. ................ 704/235 |

* cited by examiner

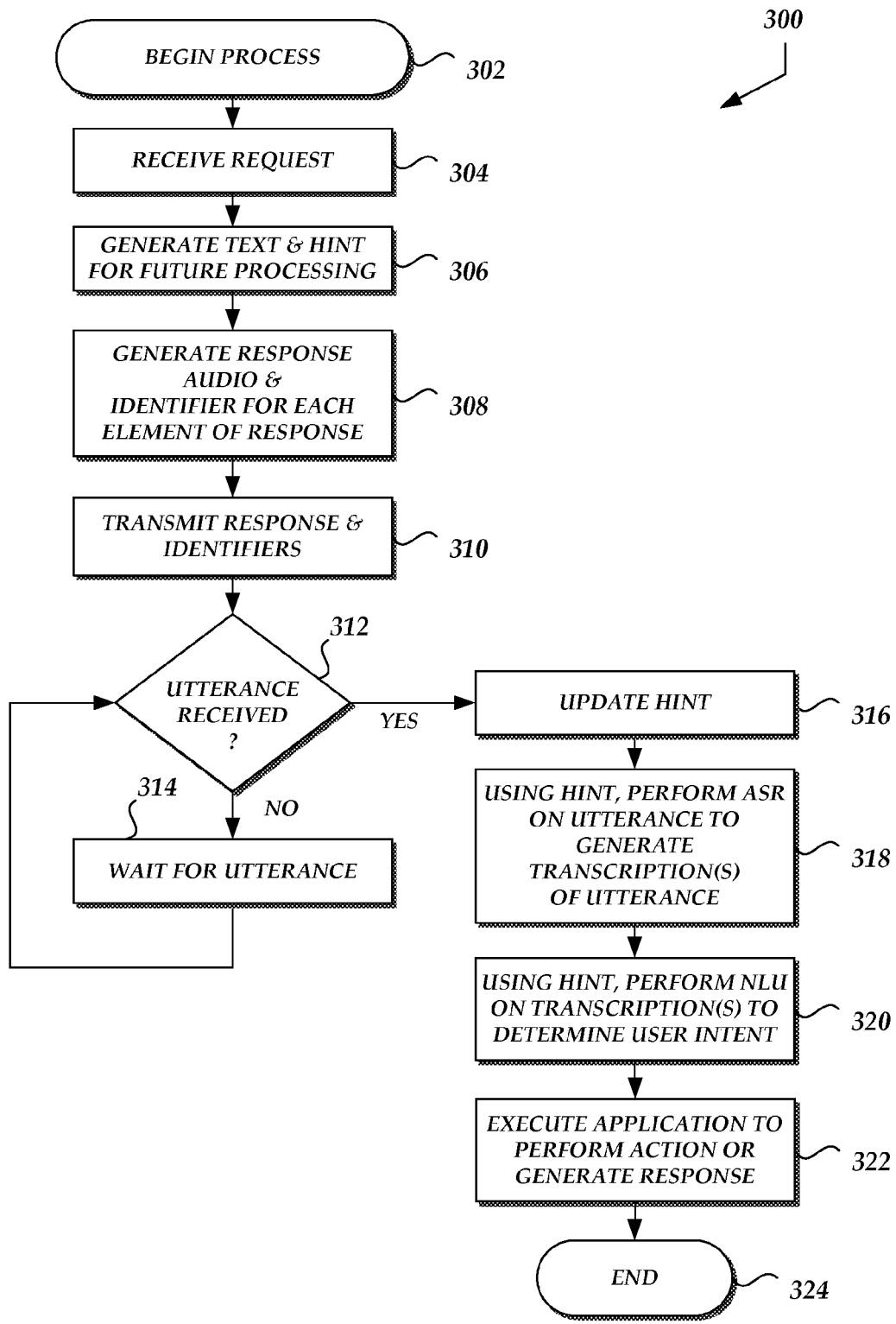

IDENTIFICATION OF UTTERANCE SUBJECTS

CROSS-REFERENCE TO RELATED APPLICATION

This application is a continuation of U.S. application Ser. No. 13/723,026, filed Dec. 20, 2012, now U.S. Pat. No. 8,977,555, the entirety of which is incorporated by reference herein.

BACKGROUND

Speech recognition systems include various modules and components for receiving speech input from a user, determining what the user said, and determining what the user meant. In some implementations, a speech processing system includes an automatic speech recognition ("ASR") module that receives audio input of a user utterance and generates one or more likely transcriptions of the utterance. Speech processing systems may also include a natural language understanding ("NLU") module that receives input, such as a transcription of a user utterance, and determines the meaning of the input in a way that can be acted upon, such as by a computer application. For example, a user of a mobile phone may speak a spoken command to initiate a phone call. Audio of the spoken command can be transcribed by the ASR module, and the NLU module can determine the user's intent (e.g., that the user wants to initiate the phone call feature) from the transcription and initiate the phone call.

Text-to-speech ("TTS") systems convert text into sound using a process sometimes known as speech synthesis. In a common implementation, a TTS system may receive input, such as text and/or Speech Synthesis Markup Language ("SSM") data, and provide an audio presentation of the input to a user. For example, a TTS system may be configured to "read" text to a user, such as the text of an email or a list of reminders.

Some systems combine both speech recognition and TTS. For example, global positioning systems ("GPS") can receive a user's spoken input regarding a particular address, generate directions for travelling to the address, and present the directions aurally to the user. In many cases, users may then continue to interact with such systems while receiving directions. After the GPS system provides the next direction or series of directions, the user may use one of any number of predetermined commands (e.g., "cancel route," "next turn"). In addition, other non-spoken user interactions may be used to interact with content that is presented aurally. For example, turn-by-turn directions can be displayed via a touch screen display that allows users to select, via a touch screen or keyboard, a particular route to bypass.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 3 is a flow diagram of an illustrative process for managing generation and transmission of an audio presentation, and for processing interactions with the audio presentation.

DETAILED DESCRIPTION

Figure 1:
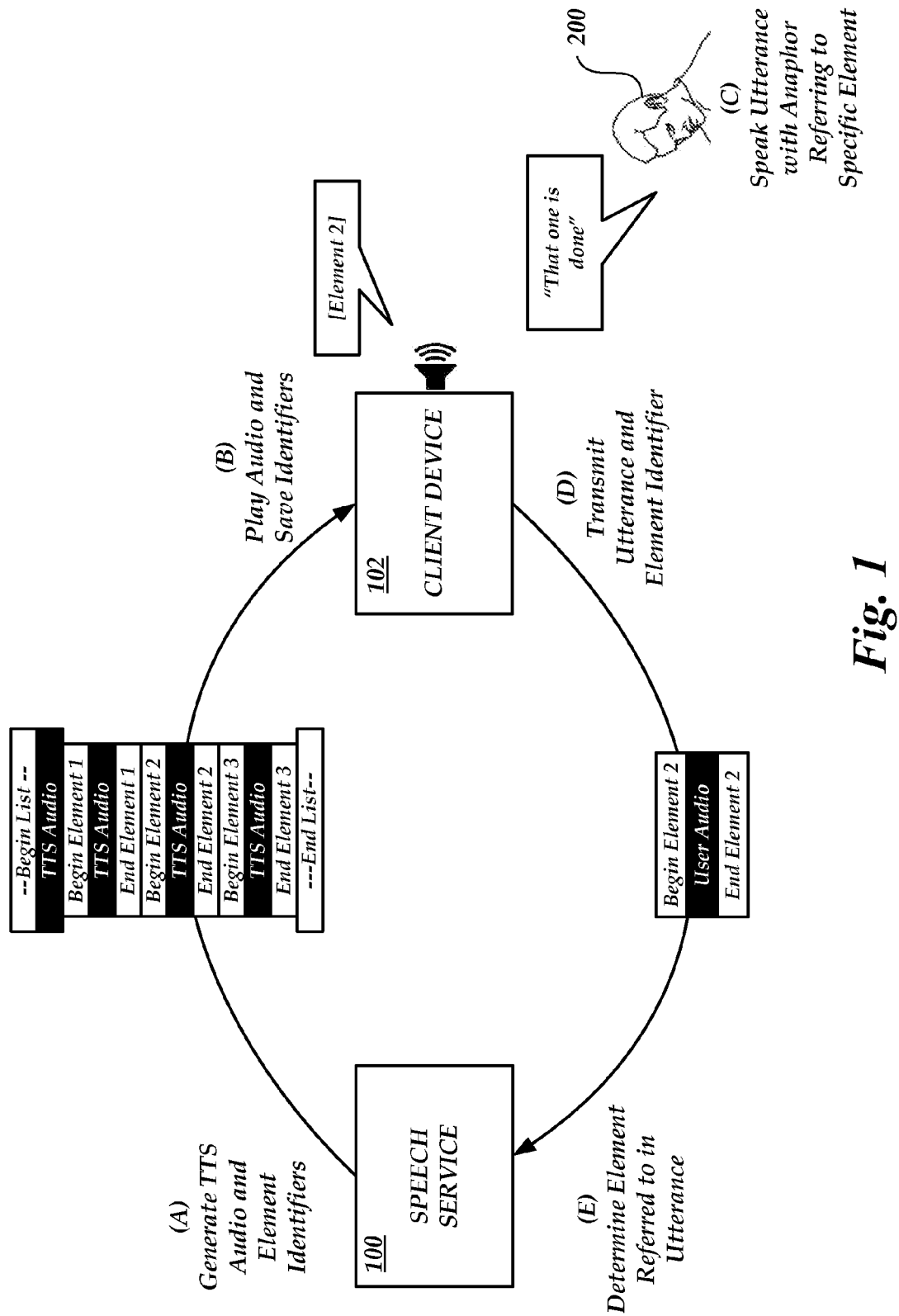
FIG. 1 is a block diagram of an illustrative networked environment in which a speech service may be implemented, showing illustrative interactions between a speech service, a client device, and a user.

Generally described, the present disclosure relates to facilitating spoken user interaction with audio content. Speech processing systems can determine transcriptions and user intents from spoken utterances. Users can issue spoken commands, and speech processing systems can use automatic speech recognition ("ASR") and natural language processing ("NLU") systems to determine what the user wants to do and automatically perform a corresponding action. It can be difficult, however, for speech processing systems to resolve an ambiguity or identify the subject of anaphor (e.g., a pronoun) without prompting the user for additional information. This is particularly true when a user issues a spoken command that does not follow a predetermined format specifically identifying the subject to which the command applies.

For example, a list of tasks may be presented to a user by a text-to-speech ("TTS") system. TTS systems can output textual content in audio format by synthesizing speech. TTS systems can synthesize speech using techniques such as unit selection (where units of recorded speech are concatenated together) and parametric techniques (where parametric models and/or hidden Markov models are used). The user may wish to mark a particular task complete as the task is audibly presented to the user or shortly thereafter. In some speech processing systems, the user may be required to wait until the task or the entire list is presented before issuing a spoken command to mark a particular task complete. In other systems, a user may pause or interrupt presentation of the list to issue commands. In these and other cases, the user may be required to indicate with specificity the particular task to mark as complete. For example, the user may say "mark the second task complete" or "mark the 'pay bills' task complete." In yet other systems, the user may mark the task complete via keyed or touch screen input, such as cases where the task list (or a visual representation of any other TTS output) is presented on a display during audio presentation of the list.

Aspects of this disclosure relate to generating identifiers or other markers for elements or other portions of audio presentations, such as TTS presentations. A speech processing system, also referred to as a speech service, can use the markers to determine which portion of the presentation a user is referring to when the user issues a spoken command or makes some other utterance during playback. The markers can be transmitted to a client device with the TTS presentation. When a user of the client device issues a spoken command during TTS playback, the marker for the particular element or portion of the TTS presentation that is being played back can be provided to a speech service along with the user utterance. In this way, the speech service can more easily determine the subject or focus of a spoken command without prompting the user for additional information. For example, during audio presentation of a list of reminders, a reminder for "pay bills" may be presented to the user. The user may say "that one's done." If a speech service does not have knowledge of which particular reminder was being presented to the user at the time the user said "that one's done," then the speech service may be unable to determine to which reminder the command applies. In such cases, many speech services prompt the user to specify which reminder the user was referring to, or to completely re-issue the command in a format that the speech service can understand. However, by providing the speech service with a marker for the reminder that was being presented when the user issued the spoken command (e.g., "reminderID=0002" or "reminder: pay bills"), the speech service can process the spoken command without requiring additional information.

Although the embodiments described in the present disclosure focus on the use of markers to indicate items in a list, the embodiments are illustrative only and are not intended to be limiting. The use of markers may be applied to any portion of an audio presentation. For example, markers can provide context for interpreting user utterances and resolving anaphora when the audio presentation is a section from a book (e.g., an audio book), rather than a list. The speech processing system may associate speech markers with character names or places referenced in the audio book. As another example, when the audio presentation is business news, speech markers may be associated with company names or stock quotes. A component of the speech processing system may recognize whether the portion is a list item or some other type of portion. In some embodiments, however, whether a portion associated with a marker is a list item or not may not be known by the speech processing system.

Additional aspects of the disclosure relate to determining which application or audio presentation, among several that may be currently active on a user device, a user is referring to when a user issues a spoken command. Some user devices, such as mobile phones or tablet computers, may be configured to present multiple audio programs simultaneously (e.g., play a song and a separate TTS presentation of a textual content item). In such cases, it may be necessary to determine which item, of the multiple audio items currently presented, that a user is referring to when the user issues a spoken command. For example, a user may be using a mobile phone to listen to music and perform other tasks at the same time, such as interact with a list of reminders. The mobile phone may continue playback of the music at a lowered volume while also playing a TTS presentation of information about a reminder. The user may issue a spoken command, such as "buy that song." In addition to the user utterance "buy that song," the mobile phone can transmit data to a speech service regarding the current song that was being played and also the current reminder that was being presented when the user issued the spoken command. The speech service can then determine, from the utterance and the data regarding the two audio presentations active on the phone at the time of the utterance, that the utterance references the song and includes a command to buy the song. If the user had instead said "that one's done," the speech service could determine that the user was referring to the reminder rather than the song. In this way, a user may use spoken commands to interact with a user device in a natural way while multitasking, without explicitly informing the device as to which audio program a spoken command applies.

Although aspects of the embodiments described in the disclosure will focus, for the purpose of illustration, on a speech service exchanging TTS audio, utterance audio, and identifier data with a separate client device via a network, one skilled in the art will appreciate that the techniques disclosed herein may be applied to any number of software processes or applications. For example, a client device may include a speech recognition engine and provide the features described herein for processing user utterances and determining which portions or presentations the user is referring to. As another example, identifiers may be associated with non-TTS audio (e.g., live or recorded audio rather than synthesized speech). Various aspects of the disclosure will now be described with regard to certain examples and embodiments, which are intended to illustrate but not limit the disclosure.

With reference to an illustrative example, a user may issue spoken commands or otherwise make spoken utterances to a client device, such as a mobile phone or tablet computer. The client device may transmit data regarding the user's utterance to a network-accessible speech service that uses an ASR module to process the utterance and transcribe what the user said. The speech service may use an NLU module to determine what the user would like to do based on the transcription from the ASR module and, optionally, one or more hints based on previous user interactions or other data. In addition, the speech service may use a TTS module to generate synthesized speech that the user may consume or with which the user may interact.

Illustratively, a user may issue a spoken command, such as "read me my task list," to a mobile phone or other client device. The client device may transmit the user utterance via a cellular telephone network, the Internet, or some other network to the speech service. The speech service's ASR module can receive the audio input of the user's utterance and output the transcription "read me my task list." The NLU module can receive the transcription and determine that the user wishes to receive an audio presentation of the user's task list. An application (e.g., a task list application) can be employed to retrieve or generate the user's task list. A hint containing or referencing the user's task list can be created for use by the various modules of the speech service during processing of subsequent user utterances. For example, the hint may include the full text of the user's task list, an identifier of the task list that can be used to retrieve the task list from a data store, a pointer to the task list in the data store, etc. Such hints can aid ASR modules, NLU modules, and other components in processing subsequent user utterances because subsequent user utterances are likely to apply to the requested content (in this case, the user's task list).

A TTS module can then prepare an audio presentation of the user's task list. In addition, data regarding each element of the list may be embedded into or associated with the audio presentation such that the user device and the speech service can easily determine which element of the task list is being presented at a given time. For example, a marker (e.g., a marker containing an identifier along with contextual information) may be inserted into the data stream indicating the start of element 1 of the list, while a second marker may be inserted to indicate the end of element 1 or the start of element 2, and so on. In some embodiments, markers may be included in the audio data stream or associated with elements in some other way. For example, a separate data stream may be created for the markers, and the two streams (e.g., one stream for the audio and a second stream for the markers) may be synchronized or otherwise cross referenced such that the marker corresponding to a particular portion of the audio stream may be easily determined.

The data stream, including the audio and the markers, may be transmitted to the client device, which presents the audio to the user. When a list element or some other portion of the audio is presented, the corresponding marker can be transmitted back to the speech service so that the speech service may know which portions have been presented, when they were presented, etc. For example, the user device may establish or maintain an upstream connection to the speech service. Markers corresponding to portions of the audio (e.g., identifiers of the items or elements in the audio) may be transmitted to the speech service as the corresponding audio portions are presented. In some embodiments, start times and end times for the presentation of each element may be transmitted with or in addition to the markers. User utterances during presentation of the user's task list can also be transmitted to the speech service as they are spoken by the user. Because the speech service has received the markers, it can determine to which element or elements the utterance likely applies based on an assumption that user utterances regarding an element are likely to be received while an element is presented, or shortly thereafter. Accordingly, the speech service can update the previously created hint to include the last-received marker or the marker that likely indicates the element to which the utterance applies. In some embodiments, timing information, such as the amount of time between the start of the user utterance the receipt of each marker, may be included in the hint. The hint, which now includes the entire list and the marker, may be provided to the NLU module so that the NLU module may more accurately determine the user's intent.

For example, audio of the first two items of the task list may be presented to the user (e.g., "go grocery shopping," "pay bills"). Identifiers or other markers for each item (e.g., "item 1," "item 2") may be transmitted to the speech service as they are encountered or as the corresponding element is presented by the presentation module of the client device during playback of the audio. Shortly after audio for the task "pay bills" is presented, the user may say "that one's done." Audio of the user's utterance may be transmitted to the speech service, in some cases as the user is speaking. At the speech service, a hint may be updated or created for the last identifier that was received by the speech service, which corresponds to the item that was presented before or during the user utterance (in this example, "pay bills"). Using the transcription of the user utterance and the hint containing the task list and the identifier "item 2," the NLU module can determine that the phrase "that one" from the utterance is referring to the second item of the task list ("pay bills"). In addition, the NLU module can determine that the word "done" indicates that the task has been completed. As a result, an application (e.g., the task list application) can be executed or employed to mark the second item of the user's task list as completed.

In some cases, the user may refer to more than one element, such as "mark them all as competed" or "the first two are done." Using the hints, the NLU can determine which items the user is referring to and what action the user would like to execute in a manner similar to that described above. For example, because the NLU has access to the entire task list from the initial hint that was generated, the NLU can determine which elements correspond to "the first two," and that the phrase "are done" means that the user would like to mark each of the first two elements as complete.

The speech service can base the hint for the particular element on the identifier for the previous element, rather than the element that was being presented when the user issued the spoken command. For example, the user may not issue a spoken command to mark an item as completed until after the TTS audio for the item has finished playing and, in some cases, the TTS audio for the subsequent item has begun. Such a scenario may happen when, for example, the TTS audio for an item is quite short (e.g., "pay bills") and the user does not have time to decide whether issue a spoken command before the audio for the next item is played. In such cases, the amount of time that has passed since a new identifier has been encountered may be tracked, either by the client device or by the speech service. If a user begins an utterance within a threshold period of time after a new identifier is encountered (e.g., 100 ms, 500 ms, etc.), the speech service may generate a hint based on the previous identifier rather than the most recently encountered identifier.

In some embodiments, the client device does not establish or maintain an upstream audio connection to the speech service throughout playback of the TTS presentation at the client device. Instead, the client device only transmits data back to the speech service when there is a user utterance to send. In such cases, the client device can track which identifiers have been encountered and when they have been encountered. The client device can then send the most recently encountered identifier and timing information to the speech service when the user makes an utterance. The speech service can then still generate and use a hint regarding the identifier.

In some embodiments, a user may be consuming audio content of one type while also listening to a TTS presentation of other content. For example, the user may be listening to a song while also listening to a TTS presentation of the user's email messages. The client device may transmit, to the speech service, data identifying the particular song that is being played in addition to data identifying the particular message of the TTS presentation. When a user issues a spoken command, the speech service can create multiple hints, or a single compound hint, indicating both audio programs that are active on the user device at the time the utterance is spoken. When the NLU module of the speech service processes the user's utterance (e.g., "What's the name of this song?"), each of the active audio presentations may be considered. In this example, the NLU can determine that the utterance relates to the song that is being played, particularly if the email message that is also being presented does not relate to music. If the user's utterance is "next message," the NLU can determine that the utterance relates to the presentation of email messages rather than music, and an application can be executed to perform one or more actions as appropriate (e.g., retrieve the next message and cause a TTS presentation of the message to be sent to the user device).

In some embodiments, the speech service may process user utterances without the aid of an NLU module or hint, as described above. Rather, an application or some other module may correlate portions of an utterance with markers when processing an utterance. For example, the ASR module may return a result (1-best, N-best, or lattice) with embedded markers that have been sent to the client device with the TTS presentation and then returned to the speech processing system when the user speaks. In such cases, an application may determine which the portion(s) of the TTS presentation to which the user utterance applies without the aid of an NLU module.

Distributed ASR System Environment

Prior to describing embodiments of processes for generating and using audio content identifiers in detail, several illustrative interactions and an example environment in which the processes may be implemented will be described. FIG. 1 illustrates illustrative interactions between a speech service 100, a client device 102, and a user 200. The speech service 100 can be a network-accessible system in communication with the client device 102 via a communication network, such as a cellular telephone network or the Internet. A user 200 may use the client device to obtain information and otherwise consume content. For example, the 200 can access the client device 102 to hear the user's 200 task list, as described above.

The speech service 100 can generate a TTS presentation of the user's 200 task list at (A). In addition to synthesized speech corresponding to each of the elements in the task list, the data stream that is transmitted to the client device 102 can include identifiers for each of the elements, for the list in general, etc. As seen in FIG. 1, the data stream may include the identifiers between each portion of synthesized speech. For example, a "Begin Element 1" and "End Element 1" identifier may surround the audio for element 1 of the task list. In some cases, rather than both a beginning and ending identifier, there may be only one identifier that signifies the beginning of an element, the ending of an element, or the transition from element-to-element.

In some embodiments, the identifiers may be transmitted separately from the audio, either within the same data stream or in separate data stream. For example, a container file format that can include both audio data and metadata, such as the Matroska, Moving Picture Experts Group-4 Part 14 ("MP4"), or Ogg file formats, may be used to transmit the audio data and also the identifier data as separate parts of a single data stream. In such cases, the identifier data can be associated with particular parts of the audio data through the use of pointers, time periods to which the identifiers apply, and the like. As another example, the audio presentation may be transmitted as any appropriately formatted audio stream, while the identifiers may be transmitted in a separate physical or logical data stream (e.g., in parallel with the audio or interpolated with the audio) such that the client device 102 may associate each identifier with the corresponding portion of the audio stream. In such cases, the identifier data may be associated with particular portions of the audio presentation either explicitly (e.g., by specifying a particular time period within the audio presentation to which the identifier applies) or implicitly (e.g., through synchronized transmission).

In some embodiments, the individual elements of the audio presentation can be transmitted as discrete transmissions, rather than part of a single continuous data stream. For example, the first element of a task list may be transmitted as a stand-alone audio transmission separate from the second element, and so on. In such cases, the identifiers may be transmitted with or alongside the audio data using any of the techniques described above.

The client device 102 can play the audio presentation at (B). In addition to playing the audio presentation, the client device 102 can save the identifier for the portion or element that is currently being presented so that the identifier can be transmitted to the speech service 100 if a user utterance is received. For example, the audio presentation may include any number of individual elements or other portions, such as a list (e.g., reminders, tasks, messages, search results, etc.). As each element is presented and an identifier is encountered, the identifier may be stored such that the identifier may be transmitted to the speech service 100 if the user 200 issues a voice command.

The user 200 may issue a spoken command at (C), such as "that one is done" if a list of tasks or reminders is presented, "delete that one" if a list of messages or other items is presented, or "go to that one" if a list of search results is presented. Upon receipt of the utterance, the client device 102 can access the stored identifier and transmit both the user utterance and the identifier (or identifiers, if multiple identifiers are used to indicate an element) at (D). As seen in FIG. 1, the transmission from the client device 102 to the speech service 100 can include the same identifiers that were originally received from the speech service 100 and audio or other data regarding the user utterance that was spoken by the user 200 when the element was presented.

In some cases, an upstream connection to the speech service 100 may be established or maintained, and each identifier (or a subset thereof) may be transmitted to the speech service 100 as the corresponding portion of the audio is presented or as the identifier is encountered. For example each identifier that was originally received from the speech service 100 may be returned to the speech service 100 before or during presentation of the corresponding element. Using the example data stream received from the speech service 100 in FIG. 1, the data stream returned to the speech service 100 during playback may include the "Begin List," "Begin Element 1," "End Element 1," and "Begin Element 2" identifiers before the user's 200 utterance is transmitted.

At (E), the speech service 100 can process the data received from the client device 102 to determine what the user 200 said, what command or other action the user 200 would like to initiate, and which element the user 200 was referring to when making the utterance. As described in detail below, the speech service 100 can use the identifier or identifiers that are returned from the client device 102 to generate a hint for the NLU module. The NLU module can use that hint, and in some cases other hints as well, in order to determine the user's intent.

Figure 2A:
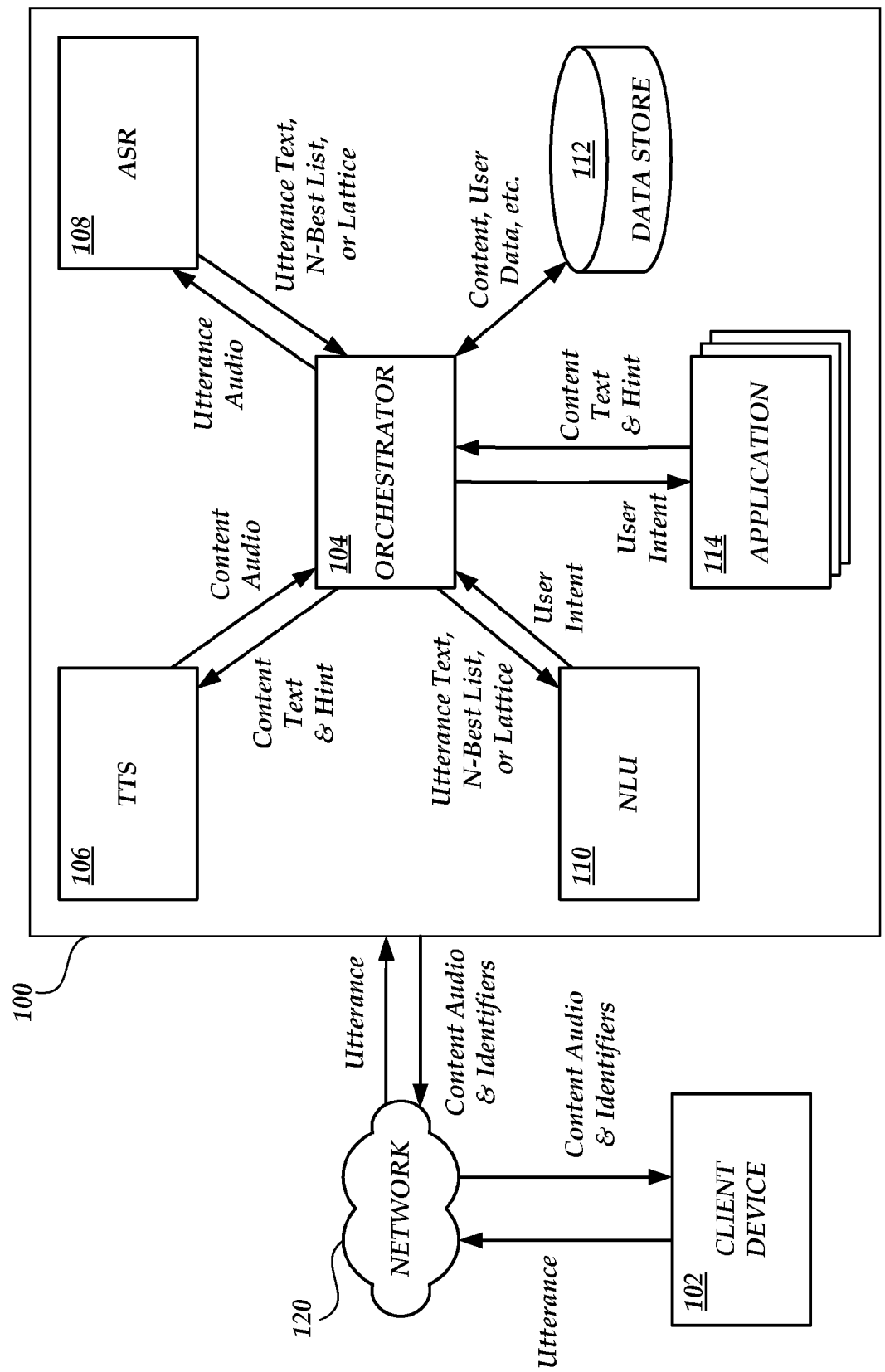
FIG. 2A is a block diagram of an illustrative speech service showing interactions between various modules and data stores during generation of an audio presentation and identifiers.
Figure 2B:
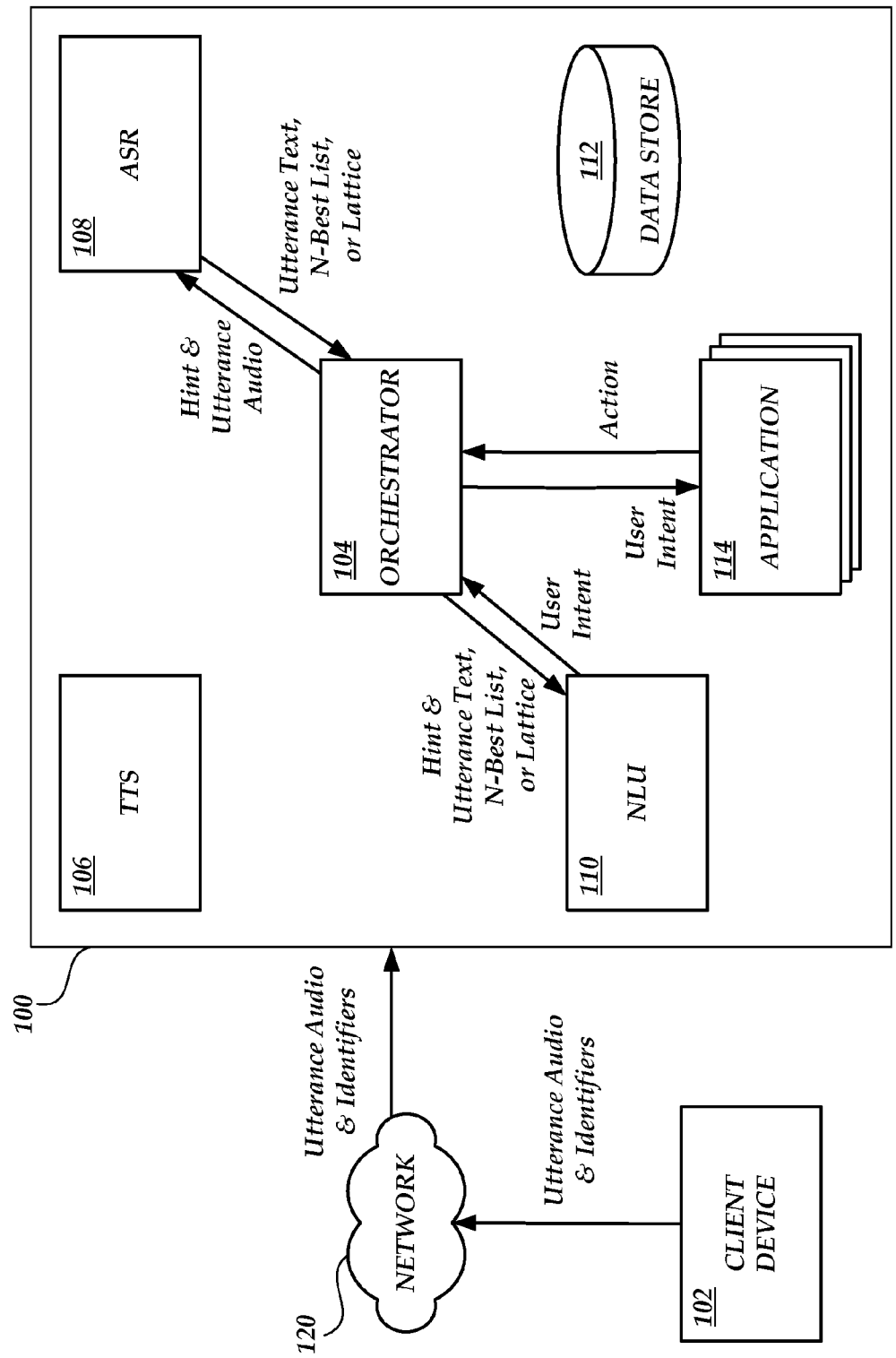
FIG. 2B is a block diagram of an illustrative speech service showing interactions between various modules during processing of a user utterance.

Turning now to FIGS. 2A and 2B, an illustrative network environment including a client device 102, a network 120, and a speech service 100 is shown. The speech service 100 may include any number of modules and components, such as an orchestrator 104, a TTS module 106, an ASR module 108, an NLU module 110, a data store 112, and one or more applications 114.

The client device 102 can correspond to a wide variety of electronic devices. In some embodiments, the client device 102 may be a mobile device that includes one or more processors and a memory which may contain software applications executed by the processors. The client device 102 may include a speaker or other audio output component for presenting or facilitating presentation of audio content. In addition, the client device 102 may contain a microphone or other audio input component for accepting speech input on which to perform speech recognition. Illustratively, the client device 102 may be a mobile phone, personal digital assistant ("PDA"), mobile gaming device, media player, electronic book reader, tablet computer, laptop computer, and the like. The software of the client device 102 may include components for establishing communications over wireless communication networks or directly with other computing devices.

The speech service 100 can be any computing system that is configured to communicate via a communication network. For example, the speech service 100 may include any number of server computing devices, desktop computing devices, mainframe computers, and the like. In some embodiments, the speech service 100 can include several devices physically or logically grouped together, such as an application server computing device configured to perform speech recognition on an utterance and a database server computing device configured to store records and speech recognition models.

In some embodiments, the speech service 100 can include various modules and components combined on a single device, multiple instances of a single module or component, etc. For example, the speech service 100 can include a separate orchestrator 104 server, a server or group of servers configured with TTS modules 106, a server or group of servers configured with ASR 108, NLU 110, and application 114 modules, and a server or group of servers configured to serve as a data store 112. In multi-device implementations, the various devices of the speech service 100 may communicate via an internal communication network, such as a corporate or university network configured as a local area network ("LAN") or a wide area network ("WAN"). In some cases, the devices of the speech service 100 may communicate over an external network, such as the Internet, or a combination of internal and external networks.

In some embodiments, the features and services provided by the speech service 100 may be implemented as web services consumable via a communication network 120. In further embodiments, the speech service 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 120 may be a publicly accessible network of linked networks, possibly operated by various distinct parties, such as the Internet. In other embodiments, the network 120 may include a private network, personal area network ("PAN"), LAN, WAN, cable network, satellite network, etc. or some combination thereof, each with access to and/or from the Internet. For example, the devices of the speech service 100 may be located within a single data center, and may communicate via a private network as described above. The client device 102 may communicate with speech service 100 via the Internet. The client device 102 may have access to the Internet via a wired or WiFi connection, or via a cellular telephone network (e.g., a Long Term Evolution or LTE network).

With reference to FIG. 2A, a client device 102 may request presentation of content, as described above. The request may be a user utterance transmitted to the speech service 100 via the network 120. The orchestrator 104 may route the request to the ASR module 108 to be processed into a transcription. The transcription can then be provided to the NLU module 110 to determine the specifics of the request and to execute or otherwise employ an application 114 to satisfy the request. In some embodiments, the speech service 100 may include multiple applications 114, such as an application to manage user task lists, a separate application to manage user reminders, a separate application to manage shopping searches for products, and the like. The appropriate application 114 for the request can be chosen based on the user intent determined by the NLU module 110. For example, if the user has requested to hear the user's task list, the task list application 114 may be executed.

The application 114 or the orchestrator 104 may generate a hint that includes or references the requested content so that future utterances may be processed with reference to the content that is presented at the time the utterance is made. The application 114 may retrieve the requested content from the data store 112 and, via the orchestrator 104, employ the TTS module 106 to generate an audio presentation of the content. The TTS module 106, orchestrator 104, or some other module or component of the speech service 100 can also generate or obtain identifiers for the various portions or elements of the audio presentation and prepare a transmission to the client device 102 that includes the audio and the identifiers.

With reference now to FIG. 2B, the client device 102 may present the content to the user. The client device 102 may establish or maintain an open connection back to the speech service 100 so that when a user makes an utterance, the utterance may be immediately transmitted to the speech service 100 without a delay normally associated with the establishment of a connection. In some embodiments, a substantially real-time stream of data captured by the client device 102 may be transmitted to the speech service 100 such that the client device 102 does not need to determine when a user is issuing a spoken command or other utterance. In addition to audio, identifiers may be transmitted to the speech service 100 as they are encountered in the data stream received from the speech service 100 or as the corresponding element or portion of the audio is presented to the user.

The user of the client device 102 may issue a spoken command that is transmitted to the speech service 100 along with an identifier of the element or portion that was presented on the client device 102 when the utterance was made. The speech service 100 can receive the identifier(s) and audio containing user utterance from the client device 102. The orchestrator 104 can prepare a hint based on one or more of the identifiers, such as the most recent identifier received before receiving audio containing a user utterance. For example, the orchestrator 104 may update the hint that was prepared in conjunction with generation of the audio presentation, as described above. The utterance and the hint can be provided to the ASR module 108 for processing into a transcript. The ASR module 108 may use the hint to narrow its search space regarding which words may be included in the utterance, because there may be an increased likelihood that the utterance will include language similar or otherwise related to the content presented to the user at the time the utterance was made.

The transcription (or an N-best list of likely transcriptions, or a lattice of ASR results) generated by the ASR may then be provided, along with the hint, to the NLU module 110. The transcription of the utterance may include pronouns and other anaphora without a corresponding antecedent. It may be difficult for the NLU module 110 to determine the subject or object that is being referred to. By using the hint, the NLU module 110 may access the particular content item and specific element or portion that was presented to the user when the user made the utterance. Accordingly, the NLU module 110 may determine with a greater degree of confidence the subject of the utterance and process the utterance accordingly to determine the user's intent. Based on the user intent as determined by the NLU module 110, an appropriate application 114 may be executed or employed to generate a response to the utterance or perform some action.

Process for Managing Generation and Usage of Identifiers

With reference now to FIG. 3, a sample process 300 for managing the generation and usage of identifiers in order to determine user intent from utterances will be described. Advantageously, a speech service 100 may use the process 300 to associate identifiers with elements or other portions of audio content. The speech service 100 can then use those identifiers to determine which element or content portion a user is referring to when a user submits utterances during playback of the audio content.

The process 300 begins at block 302. The process 300 may begin automatically upon initiation of a speech recognition session. The process 300 may be embodied in a set of executable program instructions stored on a computer-readable medium, such as one or more disk drives, of a computing system of the speech service 100, such as an orchestrator 104. When the process 300 is initiated, the executable program instructions can be loaded into memory, such as RAM, and executed by one or more processors of the computing system.

At block 304, the speech service 100 can receive a request from a client device 102. As described above, the request may be a spoken command for playback of content, such as a task list, message inbox, etc. At block 306, the speech service 100 can generate text responsive to the request and a hint for future processing relating to the request. For example, an ASR module 108 can generate an N-best list of likely transcriptions of the spoken command, and an NLU module 110 can determine a user's intent from the likely transcriptions. Based on the user's intent, an application 114 can generate text for an audio presentation responsive to the request (e.g., a list of items) and a hint for further processing related to the request. The hint may include or refer to the requested content. For example, if the request is for a list of the user's reminders, a hint may be generated indicating that the user's reminders are being presented, and in some cases, the hint may include the reminder listing or data regarding the listing.

At block 308, the TTS module 106 can generate an audio presentation from the text for playback on the client device 102. In addition, the TTS module 106 or some other component of the speech service 100 can generate identifiers corresponding to the individual elements, items, or other portions of the response. In some embodiments, applications or other modules or components that may be separate from the speech service 100 may generate the identifiers or other markers used in the process 300.

At block 310, the orchestrator 104 can transmit the TTS presentation and identifiers to the client device 102. The identifiers may be embedded with the audio of the TTS presentation in a single data stream (e.g., included with the audio in a container file or stream format) or transmitted in parallel with the audio portion of the response.

At decision block 312, the orchestrator 104 can determine whether an utterance has been received from the client device 102. If not, the process 300 may proceed to block 314, where the orchestrator 104 waits to receive an utterance from the client device 102. In some cases, data regarding the identifiers may be received as the identifiers or corresponding response portions are encountered or presented during playback on the client device 102. In response to receipt of an utterance from the client device 102, the process 300 may proceed to block 316.

At block 316, the orchestrator 104 (or some other component) can update the hint for the current request, such as by including the identifier received with the user utterance, immediately before the user utterance, etc. For example, an identifier for element "2" may be received by the orchestrator 104, followed by an identifier for element "3" and, shortly thereafter (e.g., 250 ms later), a user utterance. The orchestrator 104 may generate or update a hint indicating that the utterance likely applies to element "2" if the time period between receipt of the subsequent identifier (element "3") and the utterance is within a threshold. In this case, if the threshold is less than 250 ms, then the orchestrator 104 may generate a hint indicating that element "2" is the element to which the utterance most likely applies. If, however, the threshold is greater than 250 ms, the orchestrator 104 may generate or update a hint indicating that the utterance most likely applies to element "3." In some cases, the hint may indicate both elements and/or include data regarding the time at which the last identifier or each identifier was received so that the NLU module 110 can choose the most likely element. In some cases, the hint may indicate all elements of the content item for which an identifier has been received thus far. In some cases, the orchestrator 104 or some other component of the speech service 100 may not be able to determine the element or content portion to which the utterance applies. In such cases, a prompt may be generated and transmitted to the user to request clarification.

The hints may be provided to the various modules of the speech service 100 via programmatic procedure calls (e.g., as arguments), via messages passed across processes, via data records stored in and retrieved from a data store 112, or any other appropriate means for transmitting data among modules or, in multi-device implementations, among devices.

At block 318, the ASR module 108 may obtain the utterance audio and may use the hint to generate a transcription or N-best list of transcriptions of the utterance. As described above, use of the hints may help to narrow the search space for the ASR module 108, allowing it to provide a faster and/or more accurate transcription.

At block 320, the NLU module 110 may use the hint to determine the meaning of the user's utterance. For example, the user may have issued a spoken command to add, edit, or delete a list element, mark a task or reminder as completed, purchase an item returned in a product search, etc. However, the utterance may not have indicated with specificity to which element the command applied. Using the hint, the NLU module 110 can analyze the particular element that was presented while or just before the user issued the spoken command. If the command makes sense in the context of the particular element (e.g., a "buy that" command was issued while a product was presented), then the NLU module 110 may determine the user's intent based on the particular element.

Based on the user intent as determined by the NLU module 110, an application 114 may be executed or employed at block 322 to generate a response or perform an action. If the user intent does not make sense in the context of the particular element (e.g., the NLU module 110 determines that the user intent is to purchase a product, but a "pay the bills" reminder was presented), then the orchestrator 104 or an application 114 may generate or cause a clarifying prompt to be generated and transmitted to the client device 102.

As described above, in some cases the utterance may apply to more than one element or portion of an audio presentation. For example, a user may issue a spoken command to "buy the first two" or "buy them all" when presented with a playlist of songs. In such cases, the hint regarding the last item presented may be less important than the hint, generated in block 306, regarding the content as a whole. Because both hints may be provided to the NLU module 110, the NLU module 110 may still determine the appropriate action to take. For example, a "buy them all" command would not make sense in the context of an element hint regarding a single song title. In such case, the NLU module 110 may then analyze the content hint to determine whether the command is actionable. In this example, if the content hint indicates a playlist of song titles, the command may indeed be actionable without requiring additional information from the user. An application 114 may then obtain each song title in the playlist and initiate the process of purchasing the songs in the playlist.

Process for Transmitting Utterances and Identifiers

Figure 4:
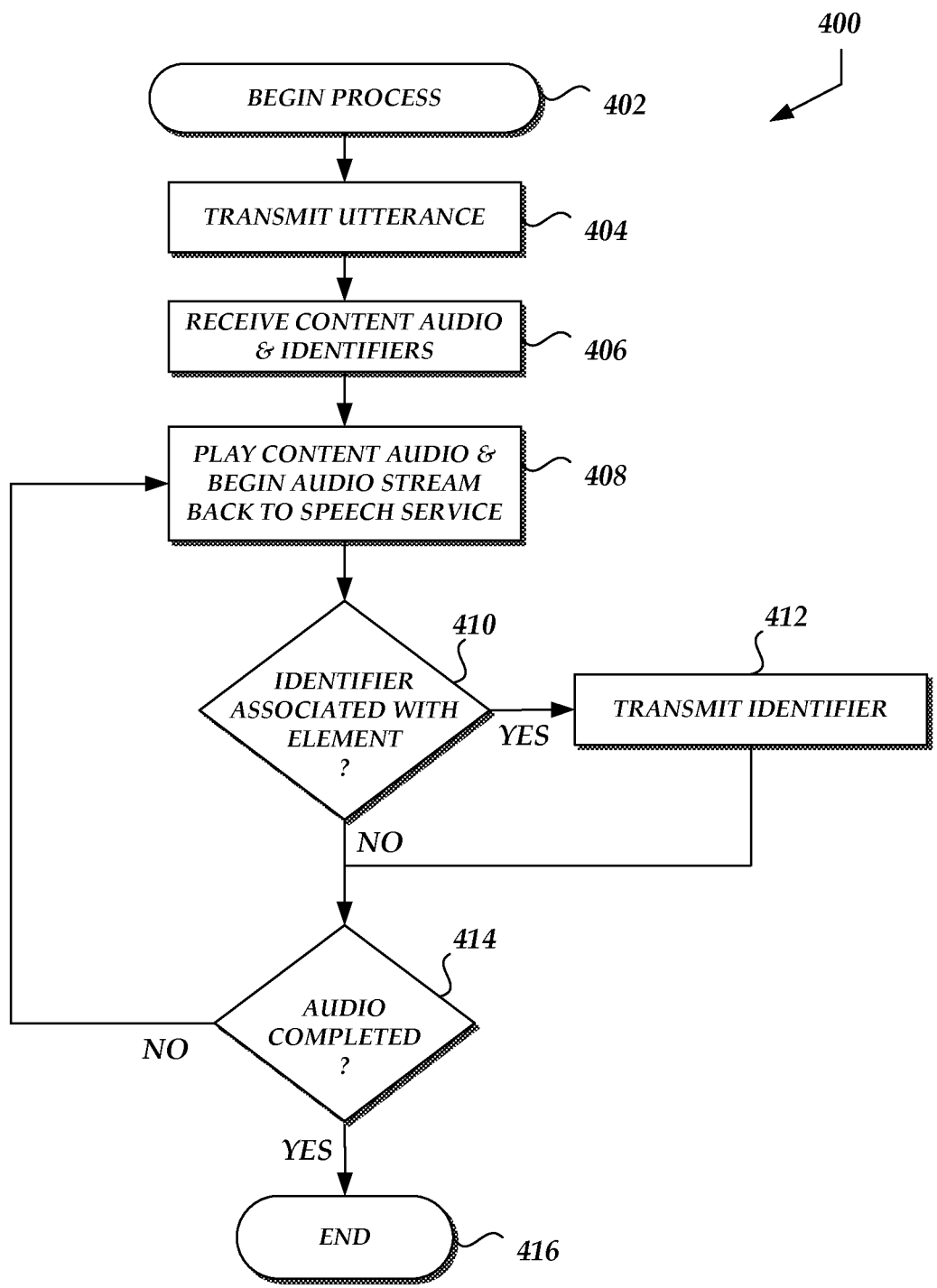
FIG. 4 is a flow diagram of an illustrative process for presenting a generated audio presentation and for transmitting user utterances regarding portions of the audio presentation.

Turning now to FIG. 4, a sample process 400 for presenting audio content and processing user interaction with the content on a client device 102 will be described. Advantageously, the process 400 may be used to parse or otherwise obtain identifiers from the data received at the client device 102, and to transmit to the speech service 100 the identifier that applies to the portion of the content that is currently being presented. When a user utterance is received, it may be transmitted to a speech service 100 so that the speech service 100 can determine which portion or element of the content was presented when the user utterance was received.

The process 400 begins at block 402. The process 400 may begin automatically upon power up of a client device 102 or upon user initiation of the process 400, such as by issuing a spoken command. The process 400 may be embodied in a set of executable program instructions stored on a computer-readable medium, such as one or more disk drives, of the client device 102. When the process 400 is initiated, the executable program instructions can be loaded into memory, such as RAM, and executed by one or more processors of the computing system.

At block 404, the client device 102 can transmit an utterance, received from a user, to an speech service 100. In one example, the utterance may include a spoken command to obtain a TTS presentation of content. At block 406, the requested audio content can be received. In addition to audio content, identifiers regarding elements or other portions of the content may also be received. As described above, the identifiers may be included with the audio in a single data stream, or they may be received separately. In some embodiments, a content item is received without a spoken request by the user. For example, the user may use touch screen or keyed input to request content. As another example, a reminder may be automatically transmitted to the client device without any user interaction.

At block 408, the client device 102 can play the received audio. At substantially the same time, or shortly before or thereafter, the client device 102 may begin transmitting an audio stream back to the speech service 100. Initiation of an audio stream back to the speech service 100 at about the same time that an audio presentation is presented on a client device 102 can allow user utterances to be transmitted to the speech service 100 in substantially real time, without the overhead or delay associated with opening a connection or otherwise initiating transfer of audio to the speech service 100.

At decision block 410, the client device 102 can determine whether an element or portion of the audio being played corresponds to or is associated with an identifier. If so, the process 400 can proceed to block 412 where the client device 102 transmits the identifier to the speech service 100. In some cases, the client device 102 does not transmit the identifier unless an utterance is received. In such cases, the identifier may be stored temporarily (e.g., in an application variable or a temporary data store) until an utterance is received or another identifier is encountered.

If no identifier is encountered, the process 400 proceeds to decision block 414. At decision block 414, the client device 102 can determine whether playback of the audio has completed. If not, the process 400 can return to block 408 where playback continues. If playback has completed, the process 400 may terminate.

Process for Identifying Audio to Which an Utterance Applies

Figure 5:
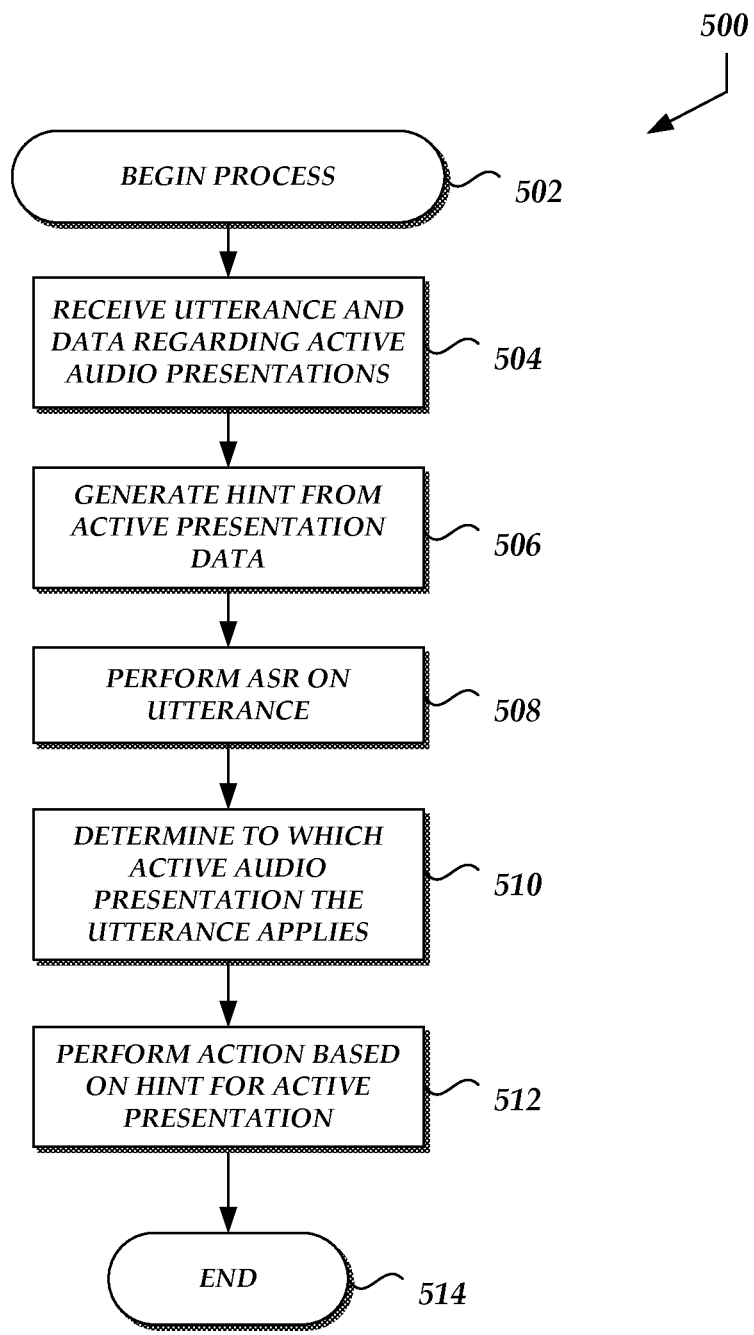
FIG. 5 is a flow diagram of an illustrative process for processing an utterance that may apply to one of multiple active audio presentations.

FIG. 5 illustrates a sample process 500 for processing a user utterance received from a client device 102 when the utterance may apply to one of multiple active audio presentations. Advantageously, the process 500 may be used to process data regarding the multiple audio presentations active on the client device 102 and to generate hints regarding the audio presentations. An NLU module 110 or some other module or component of the speech service 100 can process the utterance in light of the hints, and determine which audio presentation the user intended the spoken command or other spoken interaction to apply to when the user made the utterance.

The process 500 begins at block 502. The process 500 may begin automatically upon initiation of a speech recognition session by a client device 102 or upon receipt of an utterance from a client device 102. The process 500 may be embodied in a set of executable program instructions stored on a computer-readable medium, such as one or more disk drives, of a computing device associated with the speech service 100. When the process 500 is initiated, the executable program instructions can be loaded into memory, such as RAM, and executed by one or more processors of the computing system.

At block 504, the speech service 100 may receive a user utterance (or data regarding the utterance) from a client device 102. In addition, the speech service 100 may receive data regarding the audio presentations active on the client device 102 when the utterance was made. For example, the client device 102 may be playing music and also playing a TTS presentation at the same time. The user utterance may apply to either of the audio presentations. In order to facilitate a determination of which audio presentation the utterance applies to, the client device 102 may transmit data regarding each audio presentation to the SR server 100. The data may include identifiers associated with portions or elements of one or more of the audio presentations, as described in detail above. In such cases, the data may also indicate to which presentation the identifier applies. Alternatively the data may include general data identifying the audio presentation as a whole.

In some embodiments, the SR server 100 may have knowledge of which audio presentations are currently active on a client device 102 without receiving data from the client device 102. For example, if the user initiated either or both of the audio presentations (e.g., the music and the TTS presentation) by issuing spoken commands to the speech service 100, the speech service 100 may maintain data identifying the audio presentations that the user initiated.

At block 506, the orchestrator 104 or some other module or component of the speech service 100 can generate one or more hints from the data regarding the active presentations, similar to the generation of hints described above. At block 508, the utterance and hints may be provided to the ASR module 106, which processes the utterance to generate a transcription or a lattice or N-best list of likely transcriptions.

At block 510, the NLU module 110 can identify or otherwise determine the active presentation to which the utterance applies. For example, the transcription may indicate that the user said "buy that song." If the hints generated at block 506 or otherwise provided to the NLU module 110 indicate that audio presentations active on the client device 102 include playback of a song and playback of a TTS presentation (e.g., a task list), the NLU module 110 may determine that the user intended to act upon the audio presentation of the song. The NLU module 110 can then further examine the hints to obtain an identifier regarding which song was being played when the user made the utterance. However, if the hints generated at block 506 instead indicate that the audio presentations include playback of a song and playback of a TTS presentation regarding a listing of songs returned from a search, the NLU module 110 may require additional information in order to complete processing of the utterance. In such case, the speech service 100 may generate prompts to the user regarding which presentation or song the user was referring to.

At block 510, an application 114 can perform an action or generate a response based on the hints and processing of the user utterance by the NLU module 110. Returning to the song example, an application 114 can cause execution of an action to buy the song.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    a computer-readable memory storing executable instructions; and
    one or more processors in communication with the computer-readable memory, wherein the one or more processors are programmed by the executable instructions to at least:
        receive, from a client device, audio data corresponding to an utterance;
        receive, from the client device, marker data corresponding to a first portion of a plurality of portions of an audio presentation, the audio presentation presented by the client device contemporaneously with capture of the utterance by the client device;
        generate a transcription of the utterance by performing automatic speech recognition on at least a portion of the audio data;
        determine an action to be taken responsive to the utterance based at least partly on the transcription and the marker data; and
        perform the action.

2. The system of claim 1, wherein presentation by the client device of the audio presentation contemporaneously with capture of the utterance comprises capture of at least a portion of the utterance within a threshold period of time of presentation of the first portion.

3. The system of claim 1, wherein presentation by the client device of the audio presentation contemporaneously with capture of the utterance comprises presentation by the client device of at least a portion of the audio presentation simultaneously with capture of at least a portion of the utterance.

4. The system of claim 1, wherein presentation by the client device of the audio presentation contemporaneously with capture of the utterance comprises capture of at least a portion of the utterance after presentation of the first portion and prior to presentation of a second portion of the plurality of portions of the audio presentation.

5. The system of claim 1, wherein the marker data further comprises a first presentation identifier corresponding to the audio presentation and a second presentation identifier corresponding to a second audio presentation also being presented on the client device contemporaneously with capture of the utterance by the client device.

6. The system of claim 5, wherein the one or more processors are further programmed by the executable instructions to determine, based at least partly on the marker data, that the utterance relates to the audio presentation and not the second audio presentation.

7. The system of claim 1, wherein the one or more processors are further programmed by the executable instructions to:
    receive second marker data corresponding to a second portion of the plurality of portions of the audio presentation, wherein the second portion is presented after the first portion and prior to capture of the utterance;
determine that an amount of time between a time that presentation of the second portion was initiated and a time that the user utterance was initiated exceeds a threshold; and
determine that the utterance relates to the second portion, wherein the action to be taken responsive to the utterance relates to the second portion.

8. The system of claim 1, wherein the one or more processors are further programmed by the executable instructions to:
receive second marker data corresponding to a second portion of the plurality of portions of the audio presentation, wherein the second portion is presented after the first portion and prior to capture of the utterance;
determine that an amount of time between a time that presentation of the second portion was initiated and a time that the user utterance was initiated fails to exceed a threshold; and
determine that the utterance relates to the first portion, wherein the action to be taken responsive to the utterance relates to the first portion.

9. A computer-implemented method comprising:
under control of one or more computing devices configured with specific computer-executable instructions,
receiving, from a client device, audio data corresponding to an utterance;
receiving, from the client device, marker data corresponding to a first portion of a plurality of portions of an audio presentation, the audio presentation presented by the client device contemporaneously with capture of the utterance by the client device;
generating a transcription of the utterance by performing automatic speech recognition on at least a portion of the audio data;
determining an action to be taken responsive to the utterance based at least partly on the transcription and the marker data; and
performing the action.

10. The computer-implemented method of claim 9, wherein at least a portion of the audio presentation is presented simultaneously with capture of at least a portion of the utterance by the client device.

11. The computer-implemented method of claim 9, wherein the marker data indicates that the first portion of the audio presentation was being presented on the client device when the utterance was initiated.

12. The computer-implemented method of claim 9, wherein the marker data further comprises a first presentation identifier corresponding to the audio presentation and a second presentation identifier corresponding to a second audio presentation also being presented on the client device contemporaneously with capture of the utterance by the client device.

13. The computer-implemented method of claim 12, further comprising determining, based at least partly on the marker data, that the utterance relates to the audio presentation and not the second audio presentation.

14. The computer-implemented method of claim 9, wherein the audio presentation comprises presentation of a list of items, presentation of an audiobook, presentation of news information, or presentation of a text-to-speech audio.

15. The computer-implemented method of claim 9, wherein the action comprises selecting an item from a list of items, modifying an item from a list of items, deleting an item from a list of items, or obtaining additional information regarding a portion of the plurality of portions of the audio presentation.

16. The computer-implemented method of claim 9, further comprising:
receiving second marker data corresponding to a second portion of the plurality of portions of the audio presentation, wherein the second portion is presented after the first portion and prior to capture of the utterance;
determining that an amount of time between a time that presentation of the second portion was initiated and a time that the user utterance was initiated exceeds a threshold; and
determining that the utterance relates to the second portion, wherein the action to be taken responsive to the utterance relates to the second portion.

17. The computer-implemented method of claim 9, further comprising:
receiving second marker data corresponding to a second portion of the plurality of portions of the audio presentation, wherein the second portion is presented after the first portion and prior to capture of the utterance;
determining that an amount of time between a time that presentation of the second portion was initiated and a time that the user utterance was initiated fails to exceed a threshold; and
determining that the utterance relates to the first portion, wherein the action to be taken responsive to the utterance relates to the first portion.

18. Non-transitory computer-readable storage storing executable code that, when executed by one or more processors, causes the one or more processors to perform a process comprising:
obtaining audio data corresponding to an utterance;
obtaining marker data corresponding to a first portion of a plurality of portions of an audio presentation, the audio presentation presented contemporaneously with capture of the utterance;
generating a transcription of the utterance by performing automatic speech recognition on at least a portion of the audio data;
determining an action to be taken responsive to the utterance based at least partly on the transcription and the marker data; and
performing the action.

19. The non-transitory computer-readable storage of claim 18, wherein the executable code causes the one or more processors to obtain the audio data and the marker data via a network connection with a client computing device separate from the one or more processors.

20. The non-transitory computer-readable storage of claim 18, wherein the executable code causes the one or more processors to obtain the audio data from a microphone in communication with the one or more processors.

* * * * *